United States Patent
Okuike

(10) Patent No.: US 12,302,004 B2
(45) Date of Patent: May 13, 2025

(54) IMAGE RECOGNITION DEVICE AND IMAGE RECOGNITION METHOD

(71) Applicant: Sony Semiconductor Solutions Corporation, Kanagawa (JP)

(72) Inventor: Kazuyuki Okuike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 169 days.

(21) Appl. No.: 17/603,138

(22) PCT Filed: May 18, 2020

(86) PCT No.: PCT/JP2020/019587
§ 371 (c)(1),
(2) Date: Oct. 12, 2021

(87) PCT Pub. No.: WO2020/241336
PCT Pub. Date: Dec. 3, 2020

(65) Prior Publication Data
US 2022/0201183 A1 Jun. 23, 2022

(30) Foreign Application Priority Data
May 30, 2019 (JP) .................. 2019-101728

(51) Int. Cl.
*H04N 23/73* (2023.01)
*G01S 17/86* (2020.01)
(Continued)

(52) U.S. Cl.
CPC ............ *H04N 23/73* (2023.01); *G01S 17/86* (2020.01); *G01S 17/894* (2020.01); *G06V 10/82* (2022.01); *H04N 23/843* (2023.01)

(58) Field of Classification Search
CPC ..... H04N 25/131; H04N 25/705; H04N 23/11
See application file for complete search history.

(56) References Cited

U.S. PATENT DOCUMENTS

| 2004/0143737 A1* | 7/2004 | Teicher | ................ G06K 7/1095 |
| | | | 713/167 |
| 2011/0227750 A1* | 9/2011 | Kamiya | .................. H04N 5/32 |
| | | | 340/687 |

(Continued)

FOREIGN PATENT DOCUMENTS

| CN | 102745134 A | 10/2012 |
| CN | 104885451 A | 9/2015 |

(Continued)

OTHER PUBLICATIONS

International Search Report (PCT/ISA/210), International Application No. PCT/JP2020/019587, dated Jul. 13, 2020.

(Continued)

*Primary Examiner* — Clifford Hilaire
(74) *Attorney, Agent, or Firm* — Michael Best & Friedrich LLP

(57) ABSTRACT

Provided are an image recognition device and an image recognition method which can improve recognition accuracy of a subject. An image recognition device (an image sensor 1) according to the present disclosure includes an imaging unit (10) and a recognition unit (14). The imaging unit (10) uses the imaging pixels (R, Gr, Gb, B) which receive visible light and imaging pixels (IR) which receive (Continued)

infrared light, and images a plurality of images at the same exposure timing in one frame period to generate image data. The recognition unit (14) recognizes a subject from each of the image data.

12 Claims, 12 Drawing Sheets

(51) Int. Cl.
*G01S 17/894* (2020.01)
*G06V 10/82* (2022.01)
*H04N 23/84* (2023.01)

(56) References Cited

U.S. PATENT DOCUMENTS

| | | | |
|---|---|---|---|
| 2015/0296156 A1* | 10/2015 | Shin | H04N 25/70 348/272 |
| 2015/0304638 A1* | 10/2015 | Cho | H04N 23/20 348/46 |
| 2016/0037088 A1 | 2/2016 | Kakino | |
| 2017/0126993 A1* | 5/2017 | Madurawe | H04N 25/75 |
| 2018/0150725 A1 | 5/2018 | Tate | |
| 2018/0164156 A1* | 6/2018 | Price | H04N 13/254 |
| 2019/0156516 A1* | 5/2019 | Nikkanen | H04N 25/589 |

FOREIGN PATENT DOCUMENTS

| | | |
|---|---|---|
| CN | 105100601 A | 11/2015 |
| CN | 105379248 A | 3/2016 |
| CN | 109005363 A | 12/2018 |
| JP | 2000-285198 A | 10/2000 |
| JP | 2012-105225 A | 5/2012 |
| JP | 2014-103643 A | 6/2014 |
| JP | 2015-220716 A | 12/2015 |
| JP | 2016-033694 A | 3/2016 |

OTHER PUBLICATIONS

Notification of Transmittal of the International Search Report and the Written Opinion of the International Searching Authority, or the Declaration (PCT/ISA/220), International Application No. PCT/JP2020/019587, dated Jul. 21, 2020.
Written Opinion of the International Search Authority (PCT/ISA/237), International Application No. PCT/JP2020/019587, dated Jul. 21, 2020.

* cited by examiner

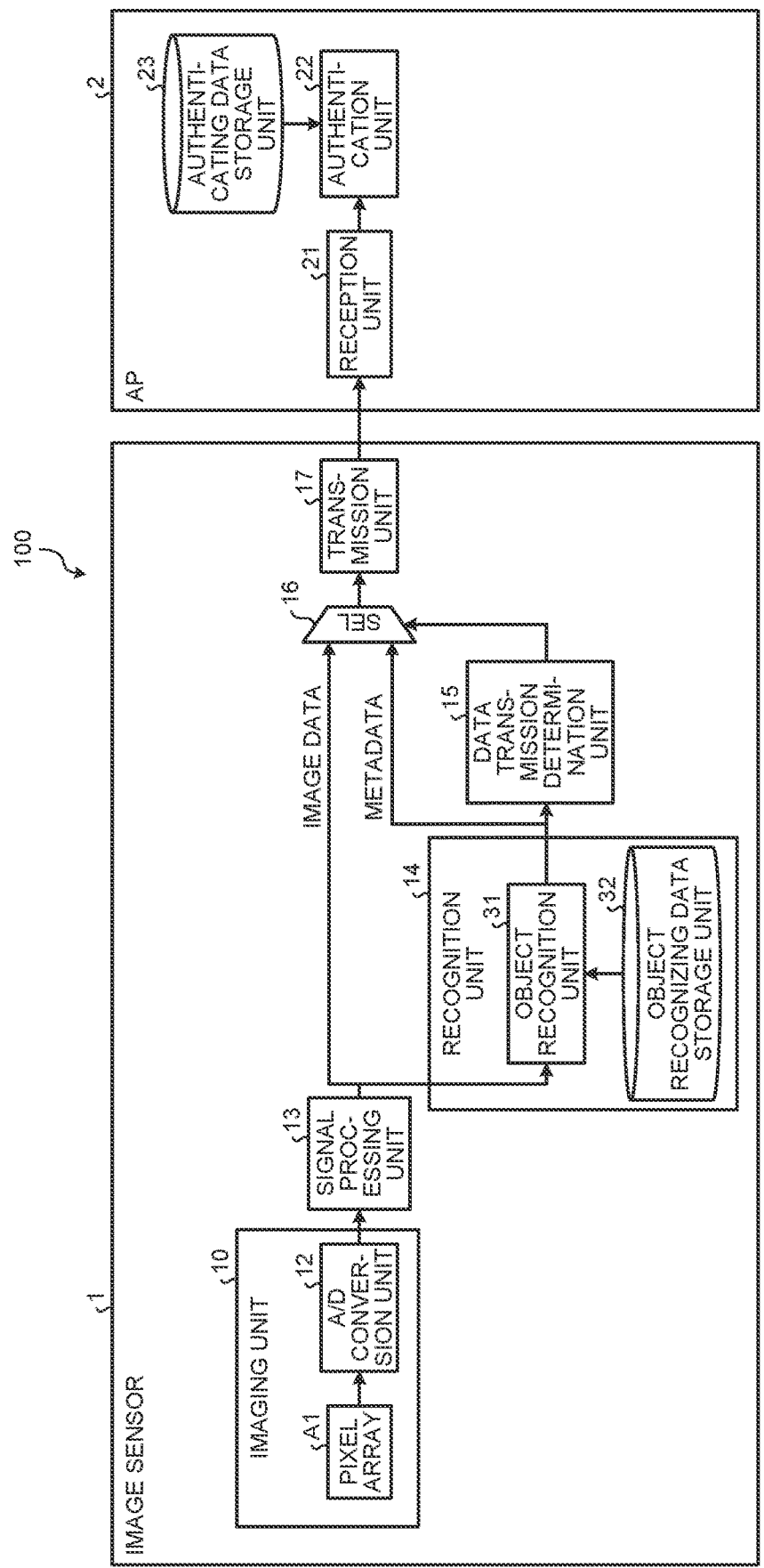

IMAGE RECOGNITION DEVICE AND IMAGE RECOGNITION METHOD

FIELD

The present disclosure relates to an image recognition device and an image recognition method.

BACKGROUND

There is an imaging device that is provided with a high dynamic range (HDR) imaging mode of generating an HDR image by imaging and synthesizing, in one frame period, a plurality of images different in sensitivity, and recognizes a subject from the HDR image (for example, see Patent Literature 1).

Moreover, there is also an imaging device that generates an HDR image by synthesizing images imaged by using imaging pixels which receive visible light and imaging pixels which receive infrared light, and recognizes a subject from the HDR image.

CITATION LIST

Patent Literature

Patent Literature 1: JP 2014-103643 A

SUMMARY

Technical Problem

However, in the above-described conventional technology, recognition accuracy of the subject sometimes decreases. Accordingly, the present disclosure proposes an image recognition device and an image recognition method which are capable of improving the recognition accuracy of the subject.

Solution to Problem

An image recognition device according to the present disclosure includes an imaging unit and a recognition unit. The imaging unit uses the imaging pixels which receive visible light and imaging pixels which receive infrared light, and images a plurality of images at the same exposure timing in one frame period to generate image data. The recognition unit recognizes a subject from each of the image data.

BRIEF DESCRIPTION OF DRAWINGS

FIG. 3 is a diagram illustrating a configuration example of an image recognition system according to the present disclosure.

DESCRIPTION OF EMBODIMENTS

Figure 1:
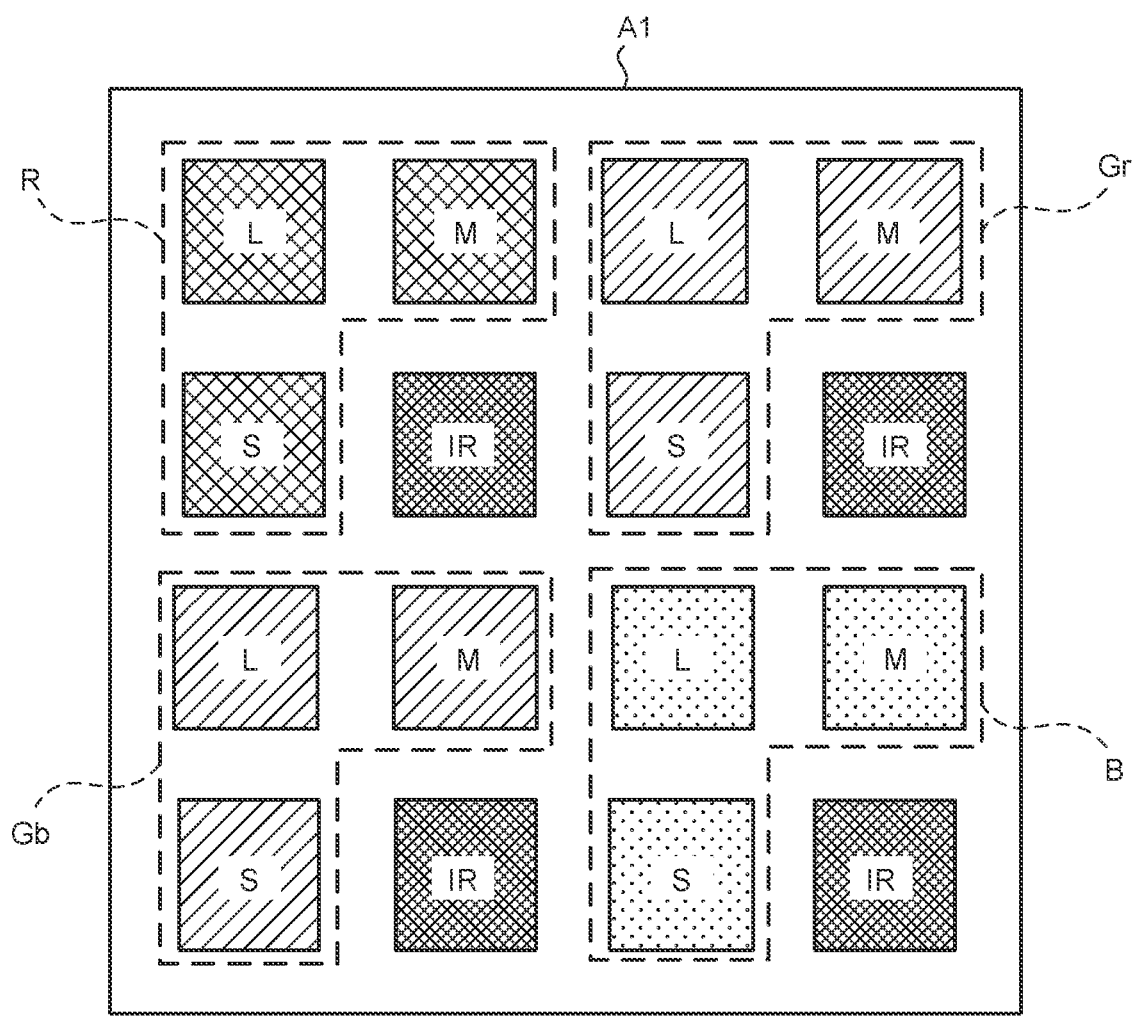
FIG. 1 is an explanatory diagram illustrating a pixel array according to the present disclosure.

A detailed description will be given below of embodiments of the present disclosure with reference to the drawings. Note that, in the following respective embodiments, the same reference numerals are given to the same portions, and a duplicate description will be omitted.

1. Overview of Image Recognition Method

First, a description will be given of an overview of an image recognition method according to the present disclosure. In the image recognition method according to the present disclosure, imaging pixels which receive visible light and imaging pixels which receive infrared light are used, a plurality of images are imaged at the same exposure timing in one frame period to generate image data, and a subject is recognized from each piece of the image data. Such imaging at the same exposure timing herein means, for example, to image an image by starting exposure of a plurality of pixels at pieces of separate timing and finishing the exposure at the same timing.

In order to image the plurality of images, a pixel array to be used for imaging a high dynamic range (HDR) image is used. FIG. 1 is an explanatory diagram illustrating a pixel array according to the present disclosure. For example, as illustrated in FIG. 1, in a pixel array A1 to be used for imaging the HDR image, an imaging pixel R that receives red light, imaging pixels Gr and Gb which receive Green light, and an imaging pixel B that receives blue light are arranged in a Bayer array.

Note that the imaging pixel Jr is an imaging pixel that is provided in a line in which the imaging pixel R is disposed, and receives green light. The imaging pixel Gb is an imaging pixel that is provided in a line in which the imaging pixel B is disposed, and receives green light.

Each of the imaging pixels R, Gr, Gb, and B includes three imaging elements which are arranged in an L shape and have the same light receiving area. An imaging element L is a long-time exposure element that has a longer exposure time than those of imaging elements M and S. The imaging element S is a short-time exposure element that has a shorter exposure, time than those of the imaging elements L and M.

The imaging element M is an intermediate-time exposure element that has an exposure time longer than that of the imaging element S and shorter than that of the imaging element L. Moreover, at each position whose three sides are surrounded by the imaging elements L, M, and S which receive light of the same color and are arranged in the L shape, the pixel array A1 includes an imaging element IR serving as an imaging pixel that receives infrared light.

The imaging element L has a long exposure time, and accordingly, can obtain a sufficient amount of received light even when a periphery thereof is dark. Thus, even if a subject is such a subject that has too low brightness and is underexposed in a usual exposure time, the imaging element L can image a high-sensitivity image on which an image of the subject is clearly reflected (hereinafter, the high-sensitivity image will also be referred to as a "long-time exposure image" in some cases).

The imaging element S has a short exposure time, and accordingly, is not saturated even when a periphery thereof is bright. Thus, even if the subject is such a subject that has too high brightness and is overexposed in the usual exposure time, the imaging element S can image a low-sensitivity image on which the image of the subject is clearly reflected (hereinafter, the low-sensitivity image will also be referred to as a "short time exposure image" in some cases). Note that the imaging element M can image an intermediate-sensitivity image (hereinafter, referred to as an "intermediate-time exposure image" in some cases) for an exposure time similar to that in a general digital camera.

The imaging element IR receives infrared light, and accordingly, can image an infrared ray (IR) image in which such an image as follows is clearly reflected, for example, the image including: a pedestrian or a vehicle in the dark, which is hard to see in the naked eye; a pedestrian hard to see due to a vehicle headlight or a spotlight; and an object hard to see due to smoke or fog. Moreover, the imaging element IR can also sense thermal information of the subject.

The HDR image is generated by performing HDR synthesis for the high-sensitivity image, the intermediate-degree image, the low-sensitivity image, and the IR image, which are described above, with one another. Therefore, the HDR image becomes an image in which images of all the subjects such as a dark subject, a bright subject, and a subject hard to see by the naked eye are clearly reflected.

Note that, in the pixel array A1 illustrated in FIG. 1, the exposure time is differentiated, whereby the high-sensitivity image, the intermediate-sensitivity image or the low-sensitivity image is imaged by the imaging element L, M or S which has the same light receiving area; however, this is an example. For example, the pixel array A1 differentiates light transmittance of a color filter to be stacked on each imaging pixel, and can thereby image the high-sensitivity image, the intermediate-sensitivity image, or the low-sensitivity image even if the exposure time is set the same.

In this case, in the pixel array A1, an imaging pixel in which light transmittance of the color filter is higher than usual becomes a high-sensitivity imaging pixel, an imaging pixel in which light transmittance of the color filter is usual becomes an intermediate-sensitivity imaging pixel, and an imaging pixel in which light transmittance of the color filter is lower than usual becomes a low-sensitivity imaging pixel.

Note that the high-sensitivity image, the intermediate-sensitivity image, or the low-sensitivity image can be imaged even if using, as the method for differentiating an exposure starting time, a method of equalizing the exposure starting time and differentiating an exposure ending time, a method of differentiating the exposure starting time and equalizing the exposure ending time, or a method of differentiating both of the exposure starting time and ending time.

Also, by such a pixel array A1, the high-sensitivity image and the low-sensitivity image can be imaged simultaneously, and accordingly, it is possible to image the HDR image by performing the HDR synthesis for both of the images. Moreover, the light receiving areas of the imaging pixels are differentiated, whereby the imaging pixels with the same light transmittance of the color filters and the same exposure time can also be caused to function as the high-sensitivity imaging pixels or the low-sensitivity imaging pixels.

Herein, as an example of a method for recognizing the subject from the image data, there is an image recognition method using a deep neural network (DNN). The DNN is an algorithm with a multi-layer structure, which adopts, as a model, a human brain nerve circuit (a neural network) designed by machine learning so as to recognize a feature (a pattern) of a subject from image data.

Figure 2A:
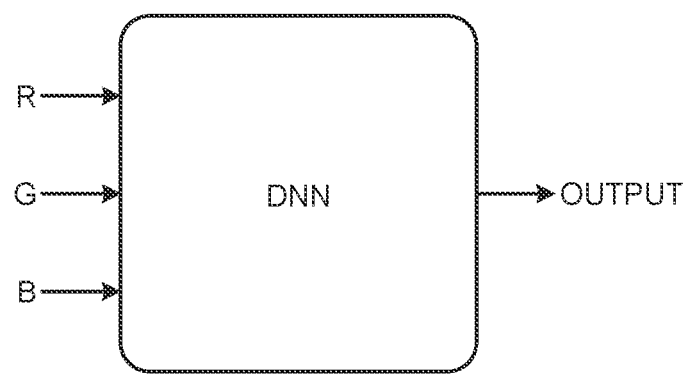
FIG. 2A is an explanatory diagram illustrating an example of using a general DNN.

FIG. 2A is an explanatory diagram illustrating an example of using a general DNN. For example, in the case of recognizing a subject from the HDR image, as illustrated in FIG. 2A, when signals R, G, and B (image data of the HDR image) of the respective pixels of red R, green G, and blue B in the HDR image already subjected to the HDR synthesis are input to the DNN, a recognition result of the subject is output from the DNN.

However, by the fact that the HDR image is subjected to the HDR synthesis, an artifact that is not actually present is sometimes reflected therein. Therefore, when the signals R, G, and B of the respective pixels in the HDR image are input to the DNN, the recognition accuracy of the subject by the DNN sometimes decreases due to a harmful effect of the artifact.

Figure 2B:
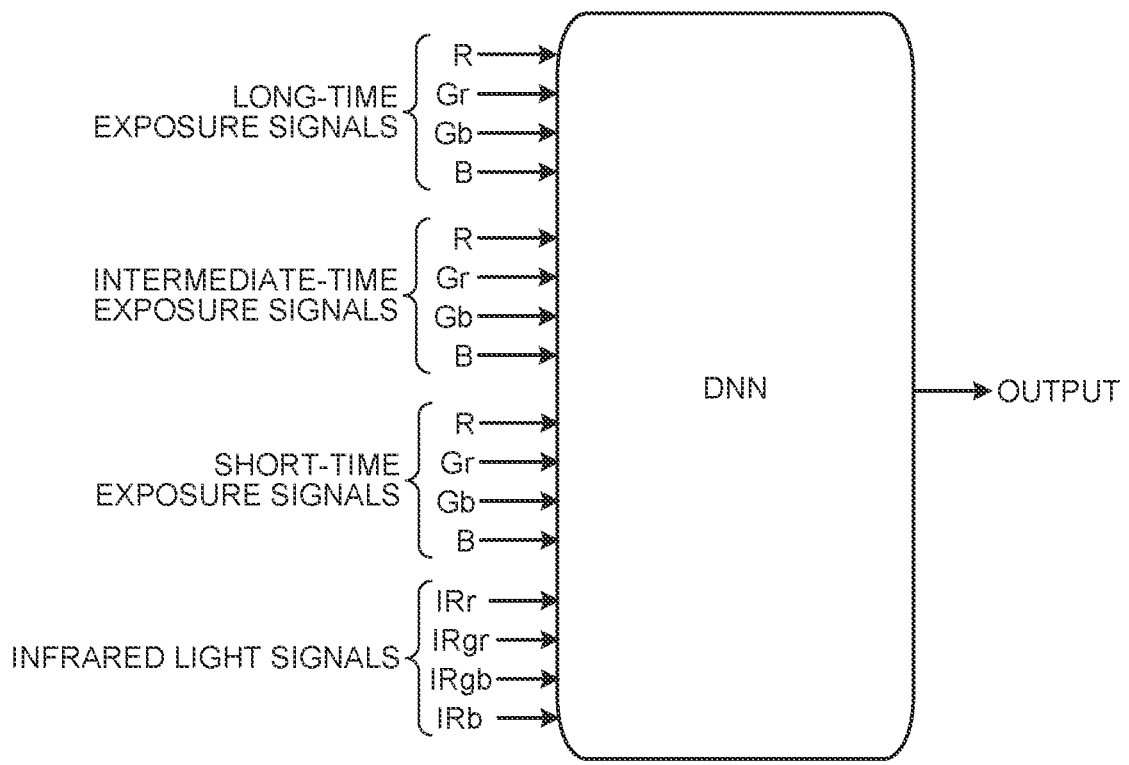
FIG. 2B is an explanatory diagram illustrating an example of using a DNN according to the present disclosure.

Accordingly, in the present disclosure, the subject is recognized from each of the high-sensitivity image, the intermediate-sensitivity image, the low-sensitivity image, and the IR image, which are not subjected to the HDR synthesis yet, whereby such an effect of the artifact is eliminated, and the recognition accuracy of the subject is improved. FIG. 2B is an explanatory diagram illustrating an example of using a DNN according to the present disclosure.

As illustrated in FIG. 2B, in the present disclosure, for example, long-time exposure signals R, Gr, Gb, and B (image data of the high-sensitivity image) to be output from the imaging element and intermediate-time exposure signals R, Gr, Gb, and B (image data of the intermediate-sensitivity image) to be output from the imaging element M are input to the DNN. Moreover, in the present disclosure, short-time exposure signals R, Gr, Gb, and B (image data of the low-sensitivity image) to be output from the imaging element S and infrared light signals IRr, IRgr, IRgb, and IRb (image data of the IR image) to be output from the imaging element IR are input to the DNN.

Thus, the DNN outputs a recognition result of recognizing the subject from the high-sensitivity image, the intermediate-sensitivity image, the low-sensitivity image, and the IR image.

At this time, the DNN recognizes the subject from the high-sensitivity image, the intermediate-sensitivity image, the low-sensitivity image, and the IR image which do not include the artifact, and accordingly, can output a highly accurate recognition result of the subject without being affected by the artifact.

As described above, in the image recognition method according to the present disclosure, imaging pixels which receive visible light and imaging pixels which receive infrared light are used, a subject is imaged at plural pieces of exposure time in one frame period, and the subject is recognized by using all of these, and accordingly, the recognition accuracy of the subject can be improved.

2. Configuration of Image Recognition System

Next, referring to FIG. 3, a description will be given of a configuration of the image recognition system according to the present disclosure. FIG. 3 is a diagram illustrating a configuration example the image recognition system according to the present disclosure. As illustrated in FIG. 3, an image recognition system 100 according to the present disclosure includes: an image sensor 1 that is an example of the image recognition device; and an application processor (hereinafter, referred to as AP 2).

The image sensor 1 includes an imaging unit 10, a signal processing unit 13, a recognition unit 14, a data transmission determination unit 15, a selector (hereinafter, referred to as SET, 16), and a transmission unit 17. The imaging unit 10 includes the pixel array A1 and an analog/digital (A/D) conversion unit 12.

The pixel array A1 images the high-sensitivity image, the intermediate-sensitivity image, the low-sensitivity image, and the IR image by the imaging elements N, S, and IR. Then, the pixel array A1 outputs analog pixel signals, which correspond to amounts of received light, from the imaging elements L, M, S, and IR to the A/D conversion unit 12.

The A/D conversion unit 12 performs A/D conversion for the analog pixel signals, which are input from the pixel array A1, into digital pixel signals, generates image data of the high-sensitivity picture, intermediate-sensitivity image data, image data of the low-sensitivity image, and image data of the infrared light, and outputs the generated image data to the signal processing unit 13.

The signal processing unit 13 includes: a microcomputer having a central processing unit (CPU), a read only memory (ROM), a random access memory (RAM), and the like; and a variety of circuits.

The signal processing unit 13 executes predetermined signal processing for each of the image data of the high-sensitivity picture, the intermediate-sensitivity image data, the image data of the low-sensitivity image, and the image data of the infrared light, which are input from the A/D conversion unit 12. Then, the signal processing unit 13 outputs the image data of the high-sensitivity picture, the intermediate-sensitivity image data, the image data of the low-sensitivity image, and the image data of the infrared light, which are already subjected to the signal processing, to the recognition unit 14 and the SEL 16.

Figure 4:
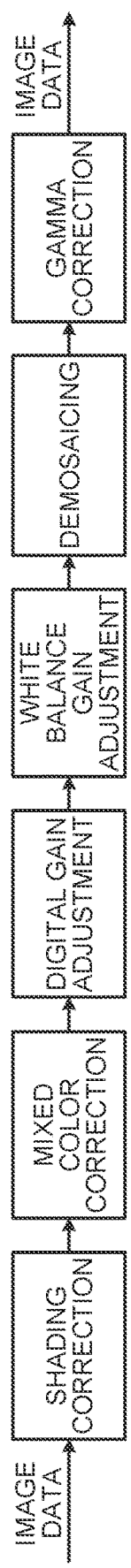
FIG. 4 is an explanatory diagram of processing to be executed by a signal processing unit according to the present disclosure.

Herein, referring to FIG. 4, a description will be given of a flow of the processing to be executed by the signal processing unit 13. FIG. 4 is an explanatory diagram of the processing to be executed by the signal processing unit according to the present disclosure. As illustrated in FIG. 4, for the image data to be input, the signal processing unit 13 first performs shading correction, and subsequently performs mixed color correction.

Thereafter, the signal processing unit 13 performs digital gain adjustment for the image data, and subsequently performs white balance gain adjustment. Thereafter, the signal processing unit 13 performs demosaicing for the image data, and thereafter, finally performs gamma correction therefor, and outputs the image data already subjected to the gamma correction.

Note that, in the demosaicing, there is performed processing for complementing colors of the respective pixels of the high-sensitivity image, the intermediate-sensitivity image, the low-sensitivity image, and the IR image by colors of surrounding pixels. Therefore, each of the image data of the high-sensitivity image, the intermediate-sensitivity image, and the low-sensitivity image which are not subjected to the demosaicing yet is four types of pixel signals R, Gr, Gb, and B; however, each of the image data already subjected to the demosaicing becomes three types of pixel signals R, G, and B. Moreover, the image data of the IR image that is not subjected to the demosaicing yet is four types of pixel signals IRr, IRgr, IRgb, and IRb; however, the image data already subjected to the demosaicing becomes one type of image signal IR.

Returning to FIG. 3, the recognition unit 14 includes: a microcomputer having a CPU, a ROM, a RAM, and the like; and a variety of circuits. The recognition unit 14 includes: an object recognition unit 31 that functions in such a manner that the CPU executes an object recognition program, which is stored in the ROM, by using the RAM as a work area; and an object recognizing data storage unit 32 provided in the RAM or the ROM. In the object recognizing data storage unit 32, the CNN is stored for each type of objects serving as the recognition targets.

The object recognition unit 31 reads a DNN, which corresponds to the type of the recognition target to be set, from the object recognizing data storage unit 32, outputs a recognition result of the subject, which is obtained by inputting the image data to the CNN and is output from the DNN, to the data transmission determination unit 15, and outputs metadata of the recognition result to the SEL 16.

Figure 5A:
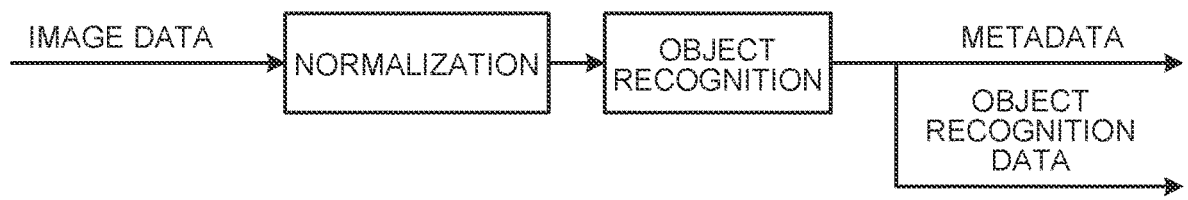
FIG. 5A is an explanatory diagram of processing to be executed by a recognition unit according to the present disclosure.
Figure 5B:
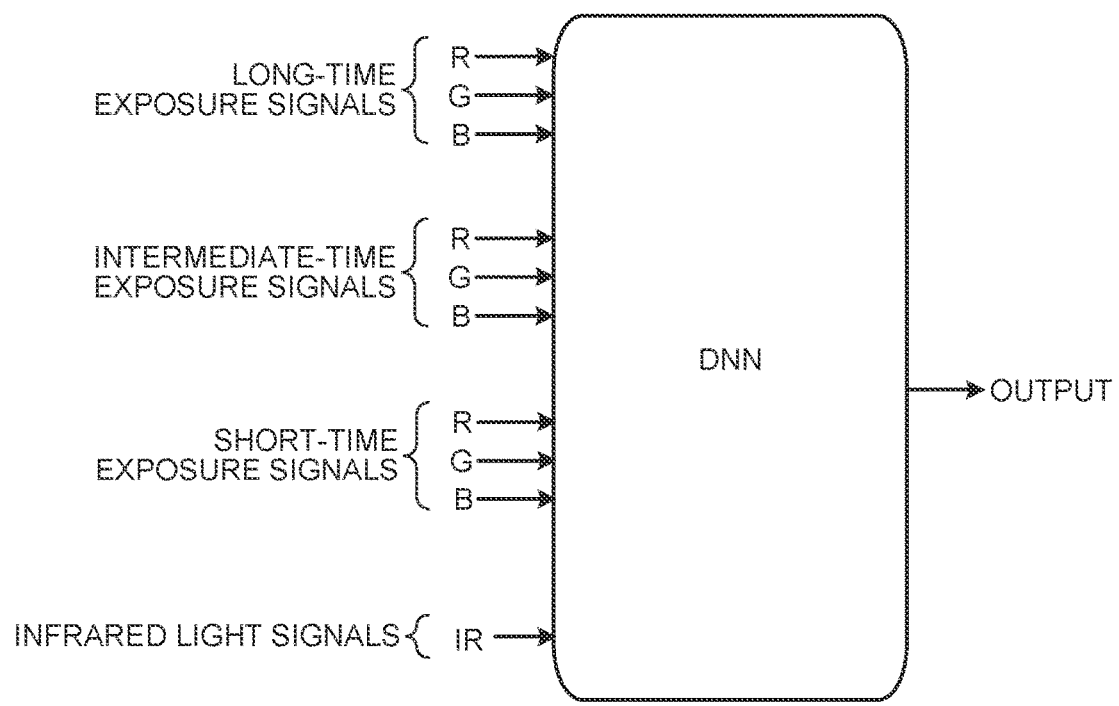
FIG. 5B is an explanatory diagram of the processing to be executed by the recognition unit according to the present disclosure.

Herein, referring to FIGS. 5A and 5B, a description will be given or a flow of the processing to be performed by the recognition unit 14. FIGS. 5A and 5B are explanatory diagrams of the processing to be executed by the recognition unit according to the present disclosure. As illustrated in FIG. 5A, in accordance with a size and an input value for the DNN, the recognition unit 14 first normalizes a size and input value of the image data to be input, inputs the already normalized image data to the DNN, and performs object recognition. Then, the recognition unit 14 outputs the recognition result of the subject, which is output from the DNN, to the data transmission determination unit 15, and outputs the metadata of the recognition result to the SEL 16.

At this time, as illustrated in FIG. 5B, to the DNN, the recognition unit 14 inputs long-time exposure signals R, G, and B, intermediate-time exposure signals R, G, and B, short-time exposure signals R, G, and B, and an infrared light signal IR. Thus, the recognition unit 14 recognizes the subject from each of the high-sensitivity image, the intermediate-sensitivity image, the low-sensitivity image, and the IR image, which are free from artifact, and can thereby improve the recognition accuracy of the subject.

Returning to FIG. 3, to the SEE 16, the data transmission determination unit 15 outputs a control signal for switching the data, which the SEL 16 is caused to output therefrom, in accordance with the recognition result input from the recognition unit 14. When the subject is recognized by the recognition unit 14, the data transmission determination unit 15 outputs, to the SEL 16, a control signal for causing the SEL 16 to output the image data and the metadata indicating the recognition result to the transmission unit 17.

Meanwhile, when the subject is not recognized by the recognition unit 14, the data transmission determination unit 15 outputs, to the SEL 16, a control signal for causing the SEL 16 to output information (no data) indicating the subject is not recognized to the transmission unit 17. In accordance with the, control signal input from the data transmission determination unit 15, the SEL 16 outputs either a set of the image data and the metadata or the no data to the transmission unit 17.

The transmission unit 17 is a communication interface (I/F) that performs data communication with the AP 2, and to the AP 2, transmits the set of the image data and the metadata, which is input from the SEL 16, or the no data.

As described above, the image sensor 1 transmits the image data to the AP 2 only in the case of recognizing the subject, does not transmit the image data to the AP 2 when the subject is not recognized, and accordingly, can reduce consumption of power required for transmitting the The AP 2 includes: a microcomputer having a CPU, a ROM, a RAM, and the like, the microcomputer executing a variety of application programs corresponding to use of the image recognition system 100; and a variety of circuits. The AP 2 includes a reception unit 21, an authentication unit 22, and an authenticating data storage unit 23.

In the authenticating data storage unit 23, there are stored an authenticating program, authenticating image data, and the like for authenticating the subject recognized by the image sensor 1. The reception unit 21 is a communication I/F that performs data communication with the image sensor 1. The reception unit 21 receives either the set of the image data and the metadata or the no data from the image sensor 1, and outputs the received one to the authentication unit 22.

The authentication unit 22 is not activated in the case of receiving the no data from the reception unit 21, and is activated in the case of receiving the set of the image data and the metadata. Upon being activated, the authentication unit 22 reads the authenticating program from the authenticating data storage unit 23 and executes the same, and authenticates the subject recognized by the image sensor 1.

For example, in the case of receiving the set of the metadata and the image data, which indicate that the subject is human, the authentication unit 22 collates the image data and human authenticating image data with each other, and performs processing for identifying who is such a person thus recognized, and the like.

At this time, the authentication unit 22 identifies the person on the basis of the image data of the high-sensitivity image, the intermediate-sensitivity image, the low-sensitivity image, and the IR image, which are free from artifact, and in which the subject is recognized to be a person by the image sensor 1 with high accuracy. Thus, the authentication unit 22 can accurately identify who is the recognized person. Note that the above-described embodiment is merely an example, and is modifiable in various ways. Next, modified examples according to the embodiment according to the present disclosure will be described.

3. Modified Example of Processing to be Executed by Signal Processing Unit

Figure 6:
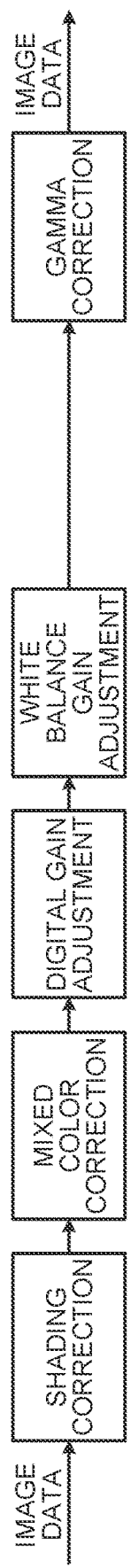
FIG. 6 is an explanatory diagram illustrating a modified example of the processing to be executed by the signal processing unit according to the present disclosure.
Figure 7:
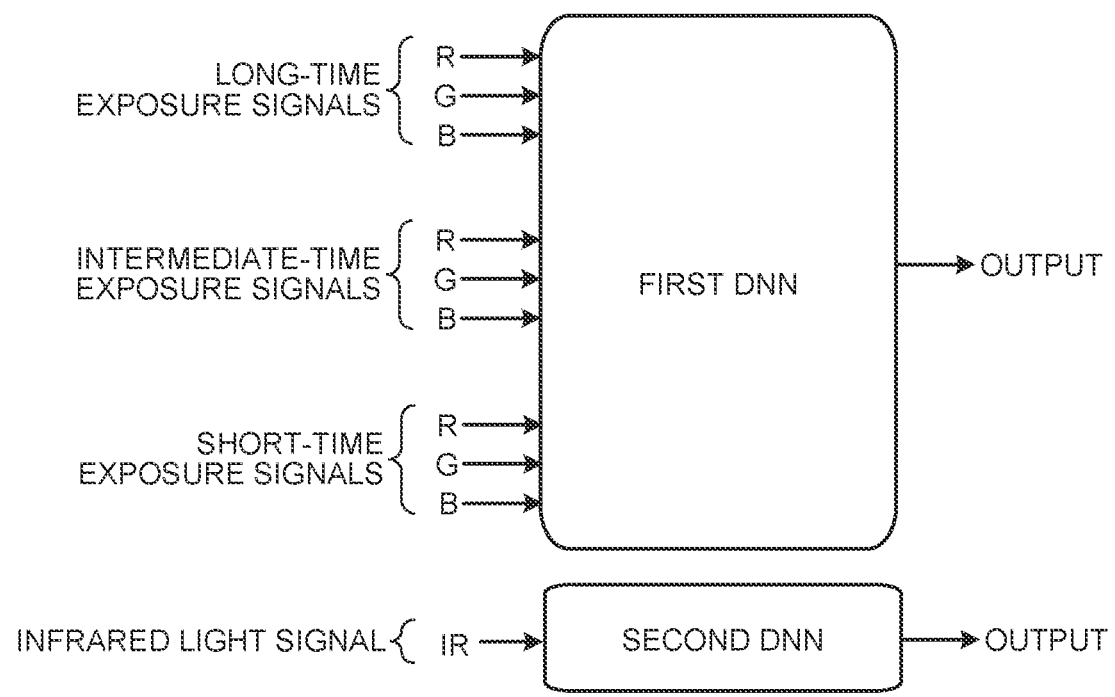
FIG. 7 is an explanatory diagram illustrating a modified example of the DNN to be used by the recognition unit according to the present disclosure.

FIG. 6 is an explanatory diagram illustrating a modified example of the processing to be executed by the signal processing unit according to the present disclosure. FIG. 7 is an explanatory diagram illustrating a modified example of the example of using the DNN according to the present disclosure.

As illustrated in FIG. 6, for the input image data, the signal processing unit according to the modified example performs the shading correction, the mixed color correction, the digital gain adjustment, the white balance gain adjustment, and the gamma correction, and outputs the image data, which is already subjected to the signal processing, to the recognition unit 14 and the sit 16.

As described above, the signal processing unit can omit the demosaicing from the signal processing illustrated in FIG. 4. In this case, the recognition unit 14 recognizes the subject from the image data that is not subjected to the demosaicing. As mentioned above, each of the image data of the high-sensitivity image, the intermediate-sensitivity image, and the low-sensitivity image, which are not subjected to the demosaicing, becomes four types of the pixel signals R, Gr, Gb, and B. Moreover, the image data of the IR image that is not subjected to the demosaicing becomes the pixel signals IRr, IRgr, IRgb, and IRb.

Therefore, to the DNN, the recognition unit 14 inputs the long-time exposure signals R, Gr, Gb, and B, the intermediate-time exposure signals R, Gr, Gb, and B, the short-time exposure signals R, Gr, Gb, and B, and the infrared light signals IRr, IRgr, IRgb, and IR (see FIG. 2B). In such a case, in the recognition unit 14, a throughput thereof increases since the number of input channels to the DNN increases. However, to the DNN, the image data of the high-sensitivity image, the intermediate-sensitivity image, the low-sensitivity image, and the IR image are individually input, and accordingly, the recognition unit 14 can recognize the subject with high accuracy without being affected by the artifact.

Note that the signal processing unit itself can also be omitted in other modified examples. Similarly, in such a case, to the DNN, the recognition unit 14 inputs the long-time exposure signals R, Gr, Gb, and B, the intermediate-time exposure signals R, Gr, Gb, and B, the short-time exposure signals R, Gr, Gb, and B, and the infrared light signals IRr, IRgr, IRgb, and IR. Therefore, though the throughput of the recognition unit 14 increases, a throughput of the whole of the image sensor 1 is greatly reduced by the amount of the signal processing that is not performed.

Note that, in the above-described embodiment, the data transmission determination unit 15 causes the SEL 16 to output the metadata of the recognition result and the image data every time in the case of recognizing the subject; however, data from which the SEL 16 is caused to output may be selected in accordance with a remaining battery capacity.

For example, when the subject is recognized by the recognition unit 14, in a normal mode in which the remaining battery capacity is equal to or more than a predetermined remaining capacity, the data transmission determination unit 15 causes the SET, 16 to output the metadata and the image data. Moreover, in a low power consumption mode in which the remaining battery capacity is less than the predetermined remaining capacity, the data transmission determination unit 15 causes the SEL 16 to output only the metadata. Thus, the data transmission determination unit 15 can suppress power consumption of the image sensor 1 to a lower level when the remaining battery capacity is insufficient.

4. Modified Example of Subject Recognition by Recognition Unit

FIG. 7 is an explanatory diagram illustrating a modified example of the DNN to be used by the recognition unit according to the present disclosure. In the examples illustrated in FIG. 2B and FIG. 5B, the recognition unit 14 recognizes the subject by using one DNN; however, two DNNs can also be used as illustrated in FIG. 7.

Specifically, the long-time exposure image, the intermediate-time exposure image, and the short-time exposure image have hues; however, the IP image does not have a hue. Therefore, between the long-time exposure image, intermediate-time exposure image, and short-time exposure images and the IR image, a feature of the subject therein is different.

Accordingly, a recognition unit according to the modified example recognizes the subject by using a first DNN and a second DNN. The first DNN is a learning model subjected to machine learning by being specialized to recognize the subject from the long-time exposure image, the intermediate-time exposure image, and the short-time exposure image. The second DNN is a learning model subjected to machine learning by being specialized to recognize the subject from the IR image.

The recognition unit according to the modified example inputs, to the first DNN, the long-time exposure signals R, G, and B, the intermediate-time exposure signals R, G, and B, and the short-time exposure signals B, G, and B, and recognizes the subject from the long-time exposure image, the intermediate-time exposure image, and the short time exposure image. Moreover, the recognition unit inputs the infrared light signal to the second DNN, and recognizes the subject from the IR image. Thus, the recognition unit can further improve the recognition accuracy of the subject.

5. Modified Example of Pixel Array

Figure 8:
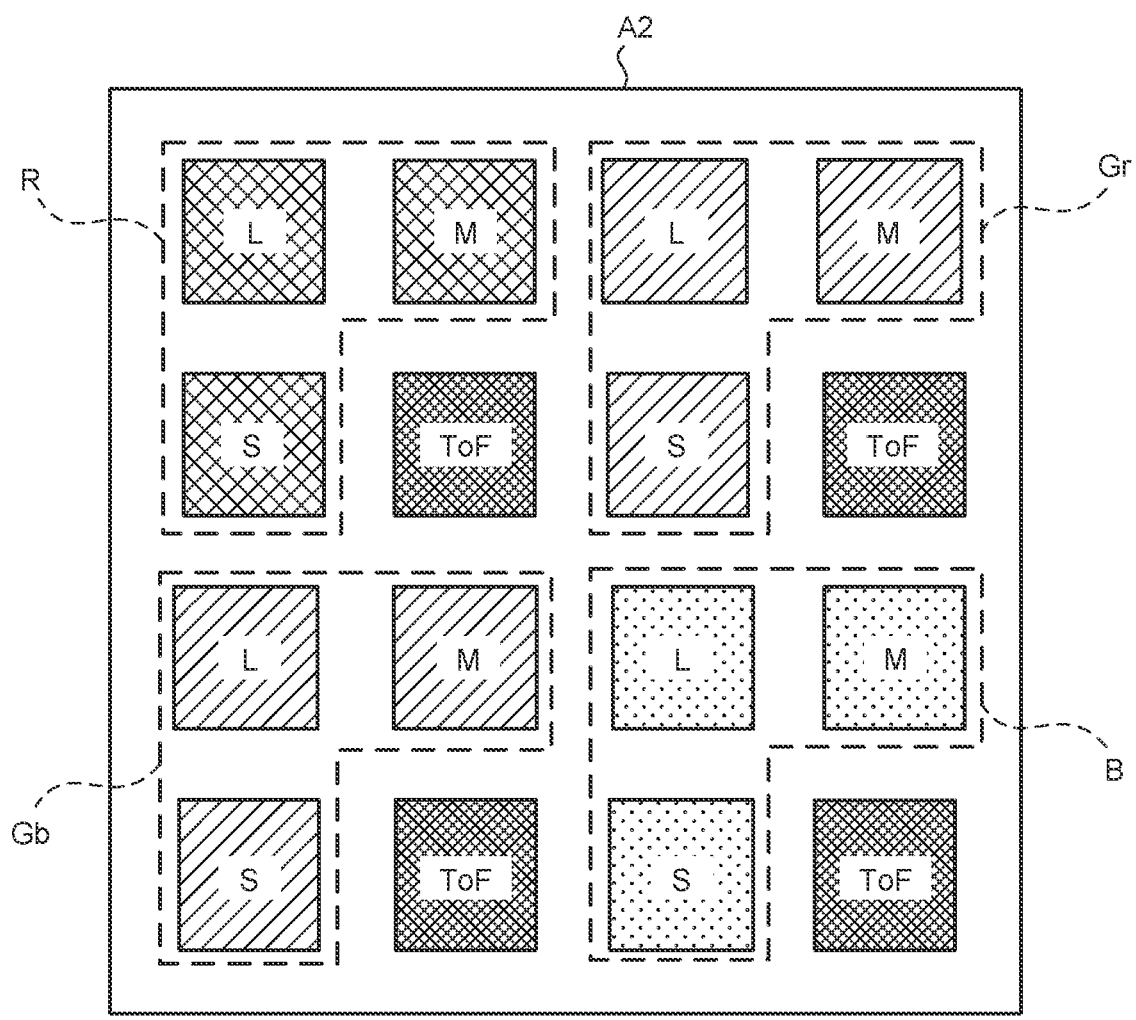
FIG. 8 is an explanatory diagram illustrating a first modified example of the pixel array according to the present disclosure.
Figure 9:
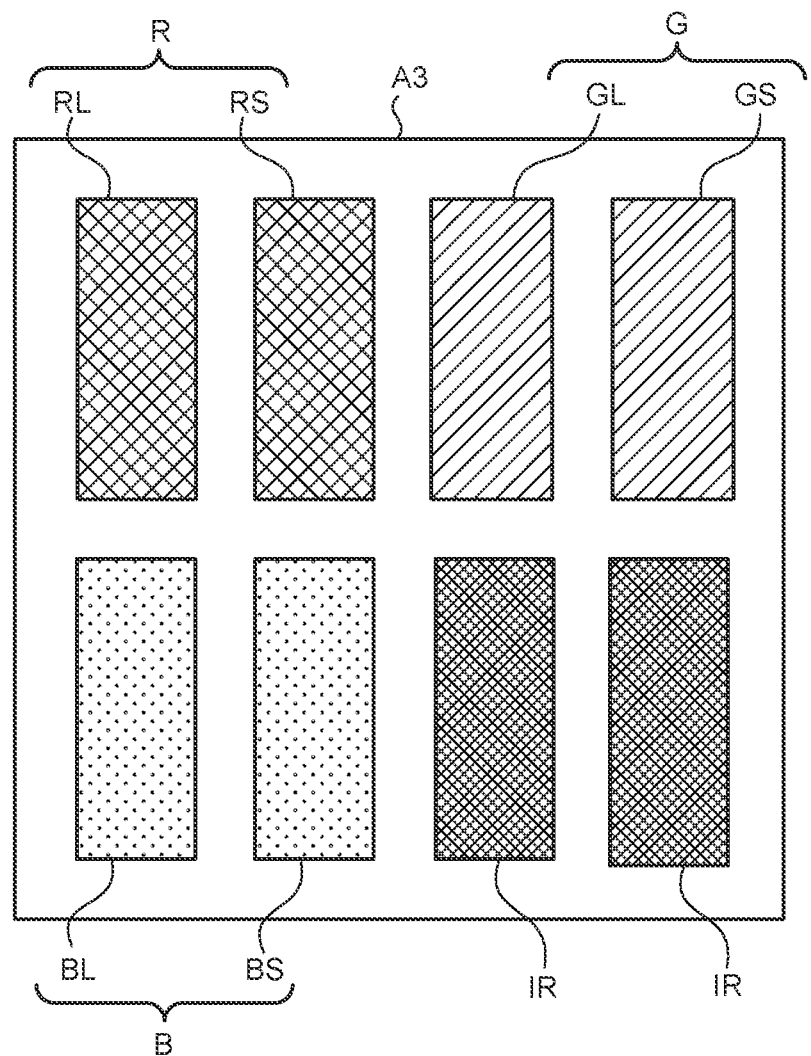
FIG. 9 is an explanatory diagram illustrating a second modified example of the pixel array according to the present disclosure.
Figure 10:
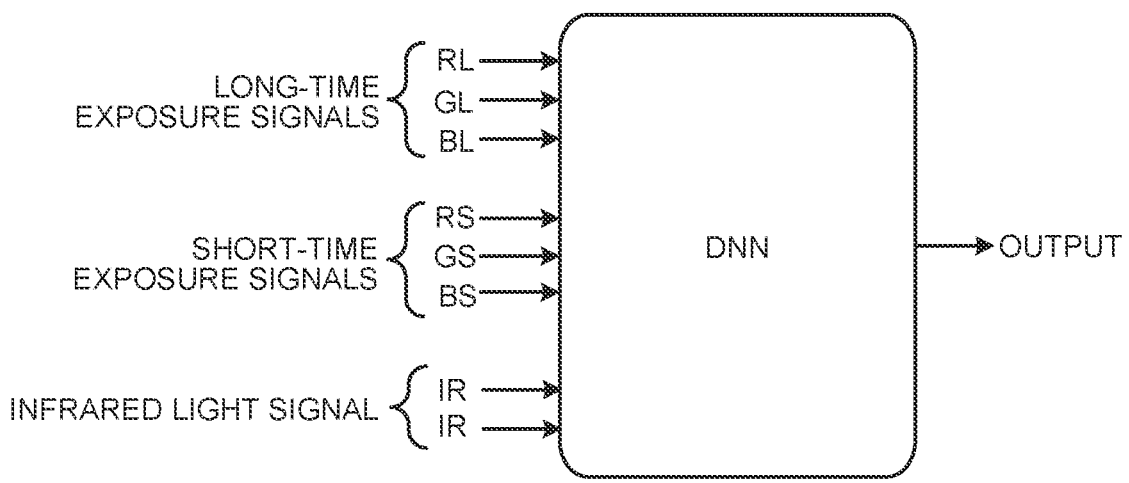
FIG. 10 is an explanatory diagram illustrating an example of using the DNN when the second modified example of the pixel array according to the present disclosure is adopted.
Figure 11:
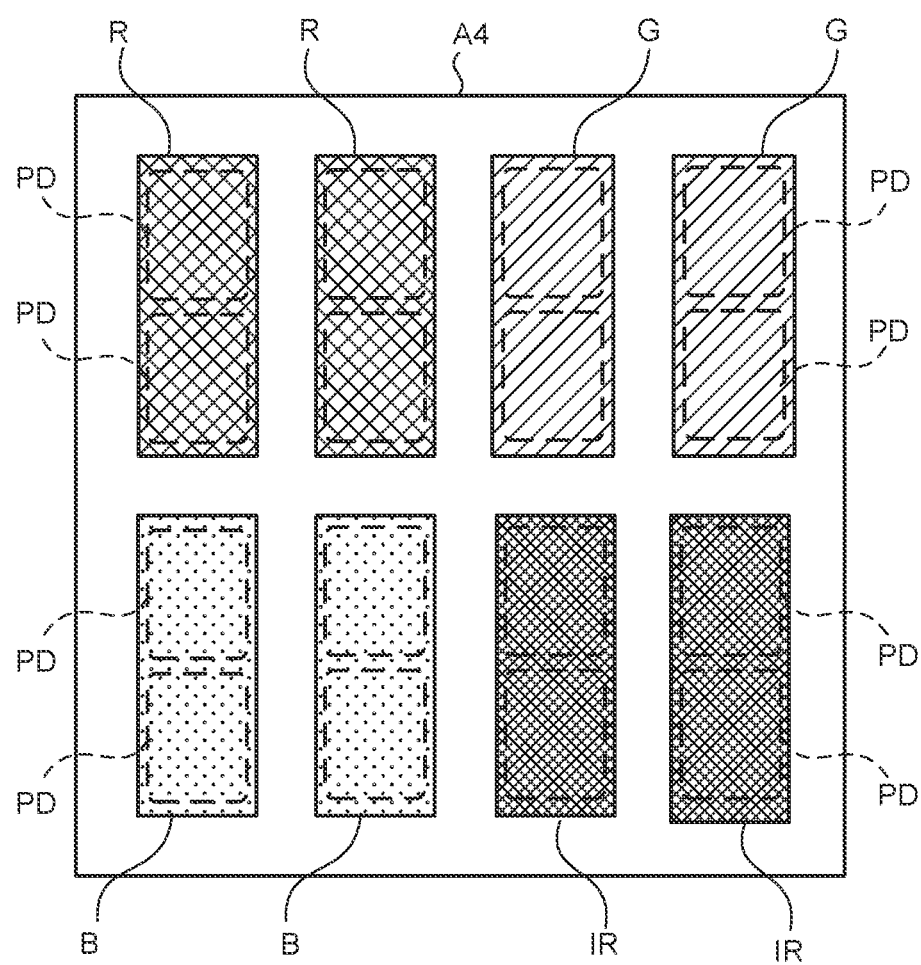
FIG. 11 is an explanatory diagram illustrating a third modified example of the pixel array according to the present disclosure.

FIG. 8 is an explanatory diagram illustrating a first modified example of the pixel array according to the present disclosure. FIG. 9 is an explanatory diagram illustrating a second modified example of the pixel array according to the present disclosure. FIG. 10 is an explanatory diagram illustrating an example of using the DNN when the second modified example of the pixel array according to the present disclosure is adopted. FIG. 11 is an explanatory diagram illustrating a third modified example of the pixel array according to the present disclosure.

As illustrated in FIG. 8, a pixel array A1 according to the first modified example includes time of Flight (ToF) sensors in place of the imaging elements IR illustrated in FIG. 1. In the case of adopting the pixel array A1, the image sensor 1 includes a light emitting unit that applies infrared light toward the subject.

Each of the ToF sensors is a sensor that measures a distance to the subject on the basis of a time since the infrared light is applied until the infrared light reflected on the subject is received. By adopting such a pixel array A2, the image sensor 1 can measure the distance to the subject as well as recognizes the subject.

Moreover, as illustrated in FIG. 9, a pixel array A3 according to the second modified example includes: an imaging pixel R that receives red light; an imaging pixel G that receives green light; an imaging pixel B that receives blue light; and an imaging pixel IR that receives infrared light.

The imaging pixel R includes an imaging element RL that is exposed for a long time and an imaging element RS that is exposed for a short time. The imaging pixel G includes an imaging element GL that is exposed for a long time and an imaging element GS that is exposed for a short time. The imaging pixel B includes an imaging element Pt that is exposed for a long time and an imaging element BS that is exposed for a short time.

As described above, in the pixel array A3, the imaging pixels B, G, and B include imaging elements RL and RS, GL and GS, and BL and BS, respectively in a one-to-two relationship. In general, such a pixel array A3 is used for autofocus that equalizes pieces of exposure time of all the imaging elements PL and RS, GL and GS, and BL and BS, which are provided in the imaging pixels R, G, and B, and automatically adjusts a focal point on the basis of phase differences each between pieces of light received by right and left imaging elements.

In the present disclosure, the pieces of exposure time of the imaging elements RL and RS, GL and GS, and BL and BS which are provided in the imaging pixels R, G, and B of such a pixel array A3 are individually controlled, whereby the imaging elements RL, GL, and BL are caused to function as long-time exposure pixels, and the imaging elements RS, GS, and BS are caused to function as short-time exposure pixels.

Thus, the pixel array A3 can image the long-time exposure image and the short-time exposure image. Moreover, the pixel array A3 includes the imaging element IR, and accordingly, can also image the IR image simultaneously with the longtime exposure image and the short-time exposure image.

When the pixel array A3 is adopted, as illustrated in FIG. 10, to the DNN, the recognition unit 14 inputs long-time exposure signals to be output from the imaging pixels RL, GL, and BL, short-time exposure signals to be output from the imaging pixels RS, GS, and BS, and infrared light signals to be output from the imaging elements IR. Thus, the recognition unit 14 can recognize the subject with high accuracy individually from the long-time exposure image, the short-time exposure image, and the IR image.

Moreover, like the pixel array A3 illustrated in FIG. 9, as illustrated in FIG. 11, a pixel array A4 according to a fourth modified example includes a pair of imaging elements R and R which receive red light, a pair of imaging elements G and G which receive green light, and imaging elements B and B which receive blue light. Moreover, the pixel array A4 includes a pair of imaging elements IR and IR which receive infrared light. Each of the imaging elements R, G, B, and IR includes two photoelectric conversion elements PD.

In such a pixel array AA, for example, among four photoelectric conversion elements PD provided in the pair of imaging elements R and R, one is exposed for a long time, two are exposed for an intermediate time, and a remaining one is exposed for a short time. Moreover, in the pixel array A4, among four photoelectric conversion elements PD provided in the pair of imaging elements G and G, one is exposed for a long time, two are exposed for an intermediate time, and a remaining one is exposed for a short time.

Moreover, in the pixel array A4, for example, among four photoelectric conversion elements PD provided in the pair of imaging elements B and B, one is exposed for a long time, two are exposed for an intermediate time, and a remaining one is exposed for a short time. Thus, the pixel array A4 can image the long-time exposure image, the intermediate-time exposure image, and the short-time exposure image.

Moreover, the pixel array A4 exposes the imaging elements IR and IR, and can thereby image an IR image. When such a pixel array A4 is adopted, then to the DNN, the recognition unit 14 inputs image data of the long-time exposure image, the intermediate-time exposure image, the short-time exposure image, and the IR image, and can thereby recognize the subject with high accuracy without being affected by the artifact.

6. Application Example to Mobile Body

The technique (the present technique) according to the present disclosure can be applied to a variety of products. For example, the technique according to the present disclosure may be achieved as a device to be mounted on any type of mobile body such as an automobile, an electric vehicle, a hybrid electric vehicle, a motorcycle, a bicycle, a personal mobility, an aircraft, a drone, a vessel, and a robot.

Figure 12:
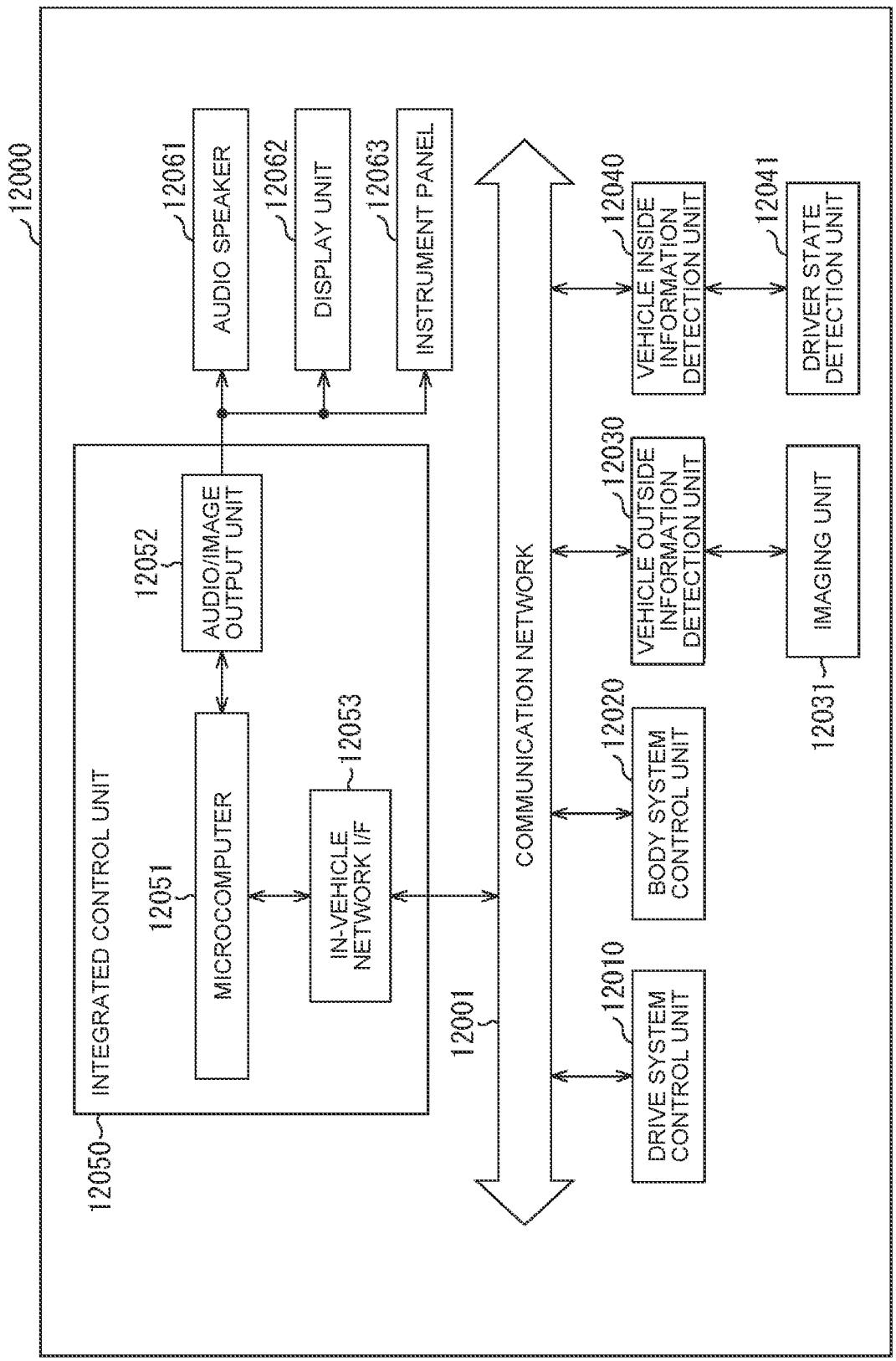
FIG. 12 is a block diagram illustrating an example of a schematic configuration of a vehicle control system.

FIG. 12 is a block diagram illustrating a schematic configuration example of a vehicle control system that is an example of a mobile body control system to which the technique according to the present disclosure is applicable.

A vehicle control system 12000 includes a plurality of electronic control units connected via a communication network 12001. In the example illustrated in FIG. 12, the vehicle control system 12000 includes a drive system control unit 12010, a body system control unit 12020, a vehicle outside information detection unit 12030, a vehicle inside information detection unit 12040, and an integrated control unit 12050. Moreover, as functional constituents of the integrated control unit 12050, illustrated are a microcomputer 12051, an audio/image output unit 12052, and an in-vehicle network interface (I/F) 12053.

In accordance with a variety of programs, the drive system control unit 12010 controls operations of devices related to the drive system of the vehicle. For example, the drive system control unit 12010 functions as a control device of: a driving force generation device for generating driving force of a vehicle, the driving force generation device being such as an internal combustion engine and a driving motor; a driving force transmission mechanism for transmitting the driving force to wheels; a steering mechanism that adjusts a steering angle of the vehicle; and a braking device that generates braking force of the vehicle.

In accordance with a variety of programs, the body system control unit 12020 controls operations of a variety of devices equipped on a vehicle body. For example, the body system control unit 12020 functions as a control device of a keyless entry system, a smart key system, a power window device, or a variety of lamps such as headlights, reverse lights, brake lights, indicator lights, and fog lights. In this case, the body system control unit 12020 can receive a radio wave to be transmitted from a portable machine that replaces a key or can receive signals of a variety of switches. The body system control unit 12020 receives the radio wave or signals, and controls a door locking device, the power window device, the lamps, and the like in the vehicle.

The vehicle outside information detection unit 12030 detects information outside of the vehicle that mounts thereon the vehicle control system 12000. For example, an imaging unit 12031 is connected to the vehicle outside information detection unit 12030. The vehicle outside information detection unit 12030 causes the imaging unit 12031 to image outside of the vehicle, and receives the image thus imaged. On the basis of the received image, the vehicle outside information detection unit 12030 may perform detection processing for an object such as a person, a vehicle, an obstacle, a sign, and a letter on a road surface, or may perform distance detection processing thereof.

The imaging unit 12031 is a photosensor that receives light and outputs an electric signal corresponding to an amount of the received light. The imaging unit 12031 can also output the electric signal as an image, and can also output the electric signal as information on distance measurement. Moreover, the light to be received by the imaging unit 12031 may be visible light, or may be invisible light such as an infrared ray.

The vehicle inside information detection unit 12040 detects information on a vehicle inside. For example, a driver state detection unit 12041 that detects a state of a driver is connected to the vehicle inside information detection unit 12040. The driver state detection unit 12041 may include, for example, a camera that images the driver, and on the basis of detection information to be input from the driver state detection unit 12041, the vehicle inside information detection unit 12040 may calculate a fatigue degree or concentration degree of the driver, or may determine whether the driver is dozing.

On the basis of information on the vehicle inside or outside, which is to be acquired by the vehicle outside information detection unit 12030 or the vehicle inside information detection unit 12040, the microcomputer 12051 can compute a control target value of the driving force generation device, the steering mechanism, or the braking device, and can output a control command to the drive system control unit 12010. For example, the microcomputer 12051 can perform a cooperative control that aims at achievement of a function of an advanced driver assistance system (ADAS), which includes collision avoidance or shock absorption of the vehicle, follow-up running based on an inter-vehicle distance, vehicle speed maintaining running, a collision warning of the vehicle, a lane deviation warning of the vehicle, or the like.

Moreover, on the basis of information around the vehicle, which is acquired by the vehicle outside information detection unit 12030 or the vehicle inside information detection unit 12040, the microcomputer 12051 controls the driving force generation device, the steering mechanism, the braking device, or the like, and can thereby perform a cooperative control that aims at autonomous driving and the like that allow the vehicle to autonomously run without relying on an operation of the driver.

Moreover, the microcomputer 12051 can output a control command to the body system control unit 12020 on the basis of information on the vehicle outside, which is acquired by the vehicle outside information detection unit 12030. For example, the microcomputer 12051 can perform a cooperative control that aims at achieving glare prevention, the cooperative control including beam switching from high to low by controlling headlights in accordance with a position of a preceding vehicle or an oncoming vehicle, which is sensed by the vehicle outside information detection unit 12030.

The audio/image output unit 12052 transmits an output signal of at least either one of a voice and an image to an output device capable of notifying a passenger or outside of the vehicle of information visually or audibly. In the example of FIG. 12, as the output device, illustrated are an audio speaker 12061, a display unit 12062, and an instrument panel 12063. For example, the display unit 12062 may include at least one of an on-board display and a head-up display.

Figure 13:
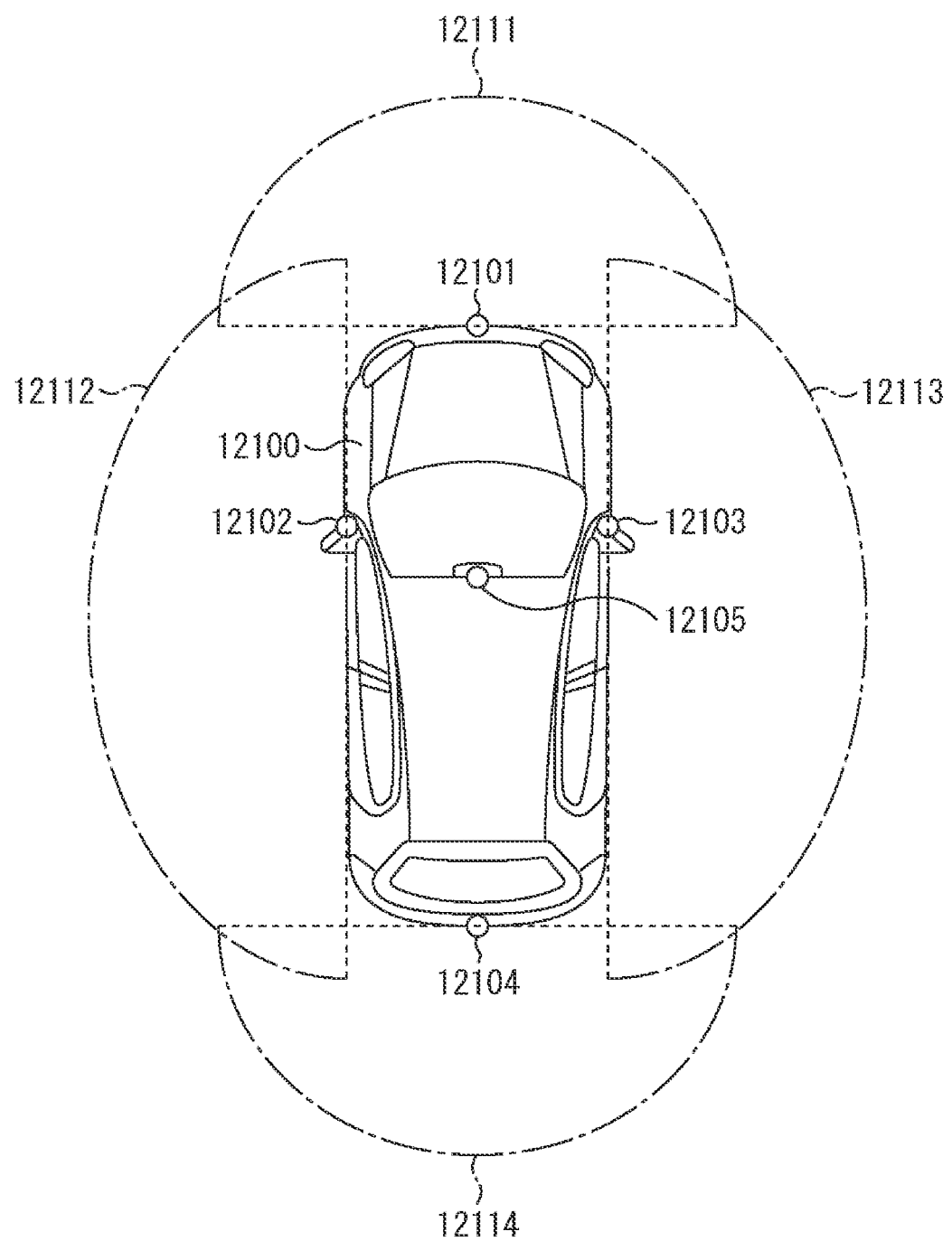
FIG. 13 is an explanatory diagram illustrating an example of installation positions of a vehicle outside information detection unit and imaging units.

FIG. 13 illustrates an example of installation positions of the imaging unit 12031.

In FIG. 13, a vehicle 12100 includes, as the imaging unit 12031, imaging units 12101, 12102, 12103, 12104, and 12105.

The imaging units 12101, 12102, 12103, 12104, and 12105 are provided, for example, at positions of the vehicle 12100, such as a front nose, side mirrors, a rear bumper, a back door, and an upper portion of a windshield, which is in an inside of a vehicle cabin. The imaging unit 12101 provided on the front nose and the imaging unit 12105 provided on the upper portion of the windshield, which is in the inside of the vehicle cabin, mainly acquire images in front of the vehicle 12100. The imaging units 12102 and 12103 provided on the side mirrors mainly acquire images on the sides of the vehicle 12100. The imaging unit 12104 provided on the rear bumper or the back door mainly acquires an image behind the vehicle 12100. Such forward images acquired by the imaging units 12101 and 12105 are mainly used for detecting a preceding vehicle, or a pedestrian, an obstacle, a traffic signal, a traffic sign, a traffic lane, or the like.

Note that FIG. 13 illustrates an example of imaging ranges of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 provided on the side mirrors, respectively, and an imaging range 12114 indicates the imaging range of the imaging unit 12104 provided on the rear bumper or the back door. For example, image data imaged by the imaging units 12101 to 12104 are superimposed on one another, whereby an overhead image in which the vehicle 12100 is viewed from above is obtained.

At least one of the imaging units 12101 to 12104 may have a function to acquire distance information. For example, at least one of the imaging units 12101 to 12104 may be a stereo camera composed of a plurality of imaging elements, or may be an imaging element having a pixel for detecting a phase difference.

On the basis of the distance information obtained from the imaging units 12101 to 12104, for example, the microcomputer 12051 obtains distances to the respective three-dimensional objects in the imaging ranges 12111 to 12114 and temporal changes of the distances (that is, relative speeds thereof with respect to the vehicle 12100), and can thereby particularly extract, as a preceding vehicle, a three-dimensional object that is closest to the vehicle 12100 while being located on a travel path thereof and runs at a predetermined speed (for example, 0 km/h or more) in substantially the same direction as the vehicle 12100. Moreover, the microcomputer 12051 can set an inter-vehicle distance, which is to be ensured in advance, on the side of the preceding vehicle, and can perform an automatic brake control (including also a follow-up stop control), an automatic acceleration control (including also a follow-up start control). As described above, the microcomputer 12051 can perform the cooperative control that aims at the autonomous driving and the like that allow the vehicle to autonomously run without relying on the operation of the driver.

On the basis of the distance information obtained from the imaging units 12101 to 12104, for example, the microcomputer 12051 can classify three-dimensional object data regarding the three-dimensional object into a motorcycle, an ordinary vehicle, a heavy vehicle, a pedestrian, and other three-dimensional objects such as a utility pole, and can extract the classified ones, which can be used for autonomous obstacle avoidance. For example, the microcomputer 12051 identifies obstacles around the vehicle 12100 into obstacles visually recognizable by the driver of the vehicle 12100 and obstacles difficult to visually recognize thereby. Then, the microcomputer 12051 determines a collision risk indicating a risk of collision with each obstacle. When the collision risk is a set value or more and there is a collision possibility, the microcomputer 12051 outputs an alarm to the driver via the audio speaker 12061 and the display unit 12062, and performs forced deceleration and avoidance steering via the drive system control unit 12010, and can thereby perform driving assistance for the collision avoidance.

At least one of the imaging units 12101 to 12104 may be an infrared camera that detects an infrared ray. For example, the microcomputer 12051 determines whether or not a pedestrian is present in the imaged images in the imaging units 12101 to 12104, and can thereby recognize the pedestrian. Such recognition of the pedestrian is performed, for example, by a procedure of extracting feature points in the imaged images in the imaging units 12101 to 12104 as such infrared cameras and a procedure of performing pattern matching processing for a series of the feature points indicating an outline of an object and determining whether or not the feature points indicate the pedestrian. When the microcomputer 12051 determines that the pedestrian is present in the imaged images in the imaging units 12101 to 12104 and recognizes the pedestrian, the audio/image output unit 12052 controls the display unit 12062 to superimpose and display an emphasizing square outline on the recognized pedestrian. Moreover, the audio/image output unit 12052 may control the display unit 12062 to display an icon or the like, which indicates the pedestrian, at a desired position.

The description has been made above of an example of the vehicle control system to which the technique according to the present disclosure is applicable. The technique according to the present disclosure is applicable, for example, to the vehicle outside information detection unit 12030, the imaging unit 12031, the vehicle inside information detection unit 12040, the driver state detection unit 12041, and the like among the constituents described above. For example, the image recognition device 1 of FIG. 1 can be applied to the vehicle inside information detection unit 12040 and the driver state detection unit 12041. The technique according to the present disclosure is applied to the vehicle inside information detection unit 12040 and the driver state detection unit 12041, whereby the recognition accuracy of the driver who is the subject is improved. Accordingly, it becomes possible to more accurately detect the fatigue degree and concentration degree of the driver, whether the driver is dozing, and so on.

7. Effect

The image sensor 1 that is an example of the image recognition device includes the imaging unit 10 and the recognition unit 14. The imaging unit 10 uses the imaging pixels R, Gr, Gb, and B which receive visible light and the imaging pixels IR which receive infrared light, and images a plurality of images at the same exposure timing in one frame period to generate image data. The recognition unit recognizes a subject from each of the image data. Thus, the image sensor 1 eliminates the influence of the artifact, and can thereby improve the recognition accuracy of the subject.

Moreover, the imaging unit 10 has the pixel array A1 in which the plurality of imaging pixels R, Gr, Gb, and B which have the same light receiving area and different pieces of exposure time and the imaging pixels IR which receive infrared light are arrayed two-dimensionally. Thus, the image sensor 1 recognizes the subject from each of the image data which have different pieces of the exposure time and the IR images, and can thereby recognize the subject with high accuracy without being affected by the artifact.

Moreover, the pixel array A1 includes: the imaging elements L which are an example of the long-time exposure imaging pixels which receive visible light; the imaging elements M which are an example of the intermediate-time exposure imaging pixels which receive the same; and the imaging elements S which are an example of the short-time exposure imaging pixels which receive the same. Thus, the image sensor 1 recognizes the subject from each of the long-time exposure image, the intermediate-time exposure image, and the short-time exposure image, and can thereby recognize the subject with high accuracy without being affected by the artifact.

Moreover, in the pixel array A3, each pixel is composed of the imaging elements RL and RS, DL and GS, or BL and BS, each pair having two imaging elements different in exposure time. Thus, the image sensor 1 can image the long-time exposure images and the short-time exposure images by using the phase difference pixels for autofocus.

Moreover, in the pixel array A4, each pixel is composed of the imaging elements R and R, G and G, or B and B, each pair having two imaging elements. Each of the imaging elements R, G, and B includes two photoelectric conversion elements Pd different in exposure time. Thus, the image sensor 1 controls the exposure time of each photoelectric conversion element PD, and can thereby image the long-time exposure image, the intermediate-time exposure image, and the short-time exposure image.

Moreover, in the case of recognizing the subject, the recognition unit 14 outputs a recognition result of the subject and image data to the AP 2 that is an example of a subsequent device, and in the case of not recognizing the subject, outputs information indicating the subject is not recognized to the AP 2. Thus, the image sensor 1 does not output the image data in the case of not recognizing the subject, and accordingly, can reduce the power consumption.

Moreover, when the remaining battery capacity is equal to or more than a predetermined remaining capacity, the recognition unit 14 outputs the recognition result of the subject and the image data to the AP 2, and when the remaining battery capacity is less than the predetermined remaining capacity, the recognition unit 14 outputs the recognition result of the subject to the AP 2 without outputting the image data to the AP 2. Thus, when the remaining battery capacity is less than the predetermined remaining capacity, the image sensor 1 does not output the image data even in the case of recognizing the subject, and accordingly, can reduce the power consumption.

Moreover, the recognition unit 14 recognizes the subject from the image data subjected to the demosaicing processing. Thus, in the case of recognizing the subject by using the DNN, the image sensor 1 reduces the number of input channels of the DNN, and can thereby reduce a processing load.

Moreover, the recognition unit 14 recognizes the subject from the image data that is not subjected to the demosaicing processing. Thus, though the throughput increases in the case of recognizing the subject by using the DNN, the image sensor 1 can recognize the subject with high accuracy from the image data of the high-sensitivity images, the intermediate-sensitivity images, the low-sensitivity images, and the IR images.

Moreover, the recognition unit 14 recognizes the subject from the image data to be input from the imaging unit 10. Thus, though the throughput increases in the case of recognizing the subject by using the DNN, the image sensor 1 can greatly reduce the throughput of the whole of the image sensor 1 by the amount of the signal processing that is not performed.

Moreover, the imaging pixels which receive infrared light are Time of Flight (ToF) sensors. Thus, the image sensor 1 can measure the distance to the subject as well as recognizes the subject.

Further, the image recognition method uses imaging pixels which receive visible light and imaging pixels which receive infrared light, images a plurality of images at the same exposure timing in one frame period to generate image data, and recognizes a subject from each piece of the image data. In accordance with such an image recognition method, the influence of the artifact is eliminated, whereby the recognition accuracy or the subject can be improved.

Note that the effects described in the present specification are merely examples and are not limited, and other effects may be present.

Note that the present technique may also adopt such configurations as follows.

(1)

An image recognition device including:
an imaging unit that uses imaging pixels which receive visible light and imaging pixels which receive infrared light, and images a plurality of images at same exposure timing in one frame period to generate image data; and a recognition unit that recognizes a subject from each piece of the image data.

(2)

The image recognition device according to (1) wherein the imaging unit includes
a pixel array in which the plurality of imaging pixels which have a same light receiving area and different pieces of exposure time and the imaging pixels which receive infrared light are arrayed two-dimensionally.

(3)

The image recognition device according to (2), wherein the pixel array includes
long-time exposure imaging pixels which receive the visible light, intermediate-time exposure imaging pixels which receive the visible light, and short-time exposure imaging pixels which receive the visible light.

(4)

The image recognition device according to (2), wherein, in the pixel array,
each pixel is composed of two imaging elements different in exposure time.

(5)

The image recognition device according to (2), wherein, in the pixel array,
each pixel is composed of two imaging elements, and each of the imaging elements includes
two photoelectric conversion elements different is exposure time.

(6)

The image recognition device according to any one of (1) to (5), wherein,
in a case of recognizing the subject, the recognition unit outputs a recognition result of the subject and the image data to a subsequent device, and in a case of not recognizing the subject, outputs information indicating the subject is not recognized to the subsequent device.

(7)

The image recognition device according to (6), wherein, when a remaining battery capacity is equal to or more than a predetermined remaining capacity, the recognition unit outputs the recognition result of the subject and the image data to the subsequent device, and when the remaining battery capacity is less than the predetermined remaining capacity, the recognition unit outputs the recognition result of the subject to the subsequent device without outputting the image data to the subsequent device.

(8)
The image recognition device according to any one of (1) to (7), wherein
the recognition unit
recognizes the subject from the image data subjected to demosaicing processing.

(9)
The image recognition device according to any one of (1) to (8), wherein
the recognition unit
recognizes the subject from the image data that is not subjected to demosaicing processing.

(10)
The image recognition device according to any one of (1) to (8), wherein
the recognition unit
recognizes the subject from the image data to be input from the imaging unit.

(11)
The image recognition device according to any one of (1) to (10), wherein
the imaging pixels which receive the infrared light are Time of Flight (ToF) sensors.

(12)
An image recognition method including:
using imaging pixels which receive visible light and imaging pixels which receive infrared light, and imaging a plurality of images at same exposure timing in one frame period to generate image data; and
recognizing a subject from each piece of the image data.

REFERENCE SIGNS LIST

100 IMAGE RECOGNITION SYSTEM
1 IMAGE SENSOR
10 IMAGING UNIT
A1, A2, A3, A4 PIXEL ARRAY
12 A/D CONVERSION UNIT
13 SIGNAL PROCESSING UNIT
14 RECOGNITION UNIT
15 DATA TRANSMISSION DETERMINATION UNIT
16 SEL
17 TRANSMISSION UNIT
2 AP
21 RECEPTION UNIT
22 AUTHENTICATION UNIT
23 AUTHENTICATING DATA STORAGE UNIT
31 OBJECT RECOGNITION UNIT
32 OBJECT RECOGNIZING DATA STORAGE UNIT

The invention claimed is:

1. An image recognition device comprising:
an image sensor including a pixel array with pixels arrayed two-dimensionally, the pixels including a first pixel, a second pixel and a third pixel in a same light receiving area, the first pixel corresponding to a first color, the second pixel corresponding to a second color, and the third pixel corresponding to a third color, each of the pixels including a first light receiving element and a second light receiving element for a corresponding color of the pixel and an infrared light receiving element, the first light receiving element being configured to have a first exposure time, the second light receiving element being configured to have a second exposure time that is different from the first exposure time,
a memory storing a program, and
a processor configured to execute the program to perform operations comprising:
receiving signals from the image sensor based upon each of the first, second and third pixels;
determining whether a subject is recognized from the signals of each of the first, second and third pixels separately from synthesizing an image data from the signals;
generating the image data from the signals received from the image sensor;
in a case of recognizing the subject, outputting a recognition result of the subject and the image data to a subsequent device; and
in a case of not recognizing the subject, outputting information indicating that the subject is not recognized to the subsequent device.

2. The image recognition device according to claim 1, wherein each of the pixels includes a third light receiving element configured to have a third exposure time, the second exposure time being longer than the first exposure time, and the third exposure time being longer than the second exposure time.

3. The image recognition device according to claim 1, wherein the operations further comprise:
when a remaining battery capacity is equal to or more than a predetermined remaining capacity, outputting the recognition result of the subject and the image data to the subsequent device, and when the remaining battery capacity is less than the predetermined remaining capacity, outputting the recognition result of the subject to the subsequent device without outputting the image data to the subsequent device.

4. The image recognition device according to claim 1, wherein the operations further comprise:
subjecting the image data to demosaicing processing prior to determining whether the subject can be recognized.

5. The image recognition device according to claim 1, wherein where operations further comprise:
determining whether the subject can be recognized prior to subjecting the image data to demosaicing processing.

6. The image recognition device according to claim 1, wherein the infrared light receiving pixels are Time of Flight (ToF) sensors.

7. An image recognition method comprising:
receiving signals from an image sensor including a pixel array with pixels arrayed two-dimensionally, the pixels including a first pixel, a second pixel and a third pixel in a same light receiving area, the first pixel corresponding to a first color, the second pixel corresponding to a second color, and the third pixel corresponding to a third color, each of the pixels including a first light receiving element and a second light receiving element for a corresponding color of the pixel and an infrared light receiving element, the first light receiving element being configured to have a first exposure time, the second light receiving element being configured to have a second exposure time that is different from the first exposure time;
determining whether a subject is recognized from the signals of each of the first, second and third pixels separately from synthesizing an image data from the signals;

generating the image data from the signals received from the image sensor;

in a case of recognizing the subject, outputting a recognition result of the subject and the image data to a subsequent device; and in a case of not recognizing the subject, outputting information indicating that the subject is not recognized to the subsequent device.

8. The image recognition method according to claim 7, wherein each of the pixels includes a third light receiving element configured to have a third exposure time, the second exposure time being longer than the first exposure time, and the third exposure time being longer than the second exposure time.

9. The image recognition method according to claim 7, further comprising:

when a remaining battery capacity is equal to or more than a predetermined remaining capacity, outputting the recognition result of the subject and the image data to the subsequent device, and when the remaining battery capacity is less than the predetermined remaining capacity, outputting the recognition result of the subject to the subsequent device without outputting the image data to the subsequent device.

10. A non-transitory computer readable medium storing program code, the program code being executable by a processor to perform operations comprising:

receiving signals from an image sensor including a pixel array with pixels arrayed two-dimensionally, the pixels including a first pixel, a second pixel and a third pixel in a same light receiving area, the first pixel corresponding to a first color, the second pixel corresponding to a second color, and the third pixel corresponding to a third color, each of the pixels including a first light receiving element and a second light receiving element for a corresponding color of the pixel and an infrared light receiving element, the first light receiving element being configured to have a first exposure time, the second light receiving element being configured to have a second exposure time that is different from the first exposure time;

determining whether a subject is recognized from the signals of each of the first, second and third pixels separately from synthesizing an image data from the signals;

generating the image data from the signals received from the image sensor;

in a case of recognizing the subject, outputting a recognition result of the subject and the image data to a subsequent device; and in a case of not recognizing the subject, outputting information indicating that the subject is not recognized to the subsequent device.

11. The non-transitory computer readable medium according to claim 10, wherein each of the pixels includes a third light receiving element configured to have a third exposure time, the second exposure time being longer than the first exposure time, and the third exposure time being longer than the second exposure time.

12. The non-transitory computer readable medium according to claim 10, wherein the operations further comprise:

when a remaining battery capacity is equal to or more than a predetermined remaining capacity, outputting the recognition result of the subject and the image data to the subsequent device, and when the remaining battery capacity is less than the predetermined remaining capacity, outputting the recognition result of the subject to the subsequent device without outputting the image data to the subsequent device.

* * * * *